June 4, 1963  K. J. TOBIN  3,092,043
FREIGHT LOADING APPARATUS
Original Filed Jan. 24, 1956  6 Sheets-Sheet 1

Fig. 1.

INVENTOR.
Kenneth J. Tobin.
BY
Harness, Dickey & Pierce
ATTORNEYS

June 4, 1963   K. J. TOBIN   3,092,043
FREIGHT LOADING APPARATUS
Original Filed Jan. 24, 1956   6 Sheets-Sheet 2

INVENTOR.
Kenneth J. Tobin.
BY
Harness, Dickey & Pierce
ATTORNEYS

United States Patent Office 3,092,043
Patented June 4, 1963

3,092,043
FREIGHT LOADING APPARATUS
Kenneth J. Tobin, Sarasota, Fla., assignor to Evans Products Company, Plymouth, Mich., a corporation of Delaware
Application Jan. 24, 1956, Ser. No. 561,026, now Patent No. 2,873,695, dated Feb. 17, 1959, which is a continuation of application Ser. No. 258,403, Nov. 27, 1951. Divided and this application Nov. 4, 1957, Ser. No. 694,249
4 Claims. (Cl. 105—369)

This invention relates to freight loading apparatus which may be installed in transport vehicles such as railroad cars.

It is an object of this invention to provide freight loading apparatus which may be readily installed on the wooden lining or inner wall of existing type freight cars.

Another object of the invention is to provide freight loading apparatus of such a nature that when the movable parts are removed an ordinary, as distinguished from a "special," freight car remains.

Another object of the invention is to provide freight loading apparatus which is substantially dunnage free and which does not substantially decrease the inside dimensions of the freight car.

Another object of the invention is to provide freight loading apparatus which is at least as adjustable as the freight loading apparatus known heretofore, but which is appreciably less expensive to manufacture and install.

Another object of the invention is to provide freight loading apparatus which is especially well adapted for use in insulated chambers such as refrigerator cars.

Another object of the invention is to provide freight loading apparatus including fabricated deckboards that may be also used to form intermediate platforms and bin partitions. The invention also contemplates a side door opening in the freight car which is equal in width to the inside width of the car whereby the same deckboards and cross bars may be used to provide a grain door or the like.

The invention contemplates the use of suitably strengthened holes in the conventional wooden inner wall of a double-wall freight car to support cross bars extending transversely of the car. In simplest form, a large number of holes may be drilled in the conventional wooden lining or inner wall of the freight car and then fitted with sleeves or thimbles that are preferably formed of steel, the holes receiving axially projecting bearing surfaces on the ends of the cross bars. In preferred form, however, the holes in the wooden lining of the freight car are strengthened by the use of thin metal plates which are attached to the wooden walls and upright posts of the freight car and which serve to distribute throughout a wide area loads which may be applied locally to the wall of a hole. Preferably, holes are formed in the metal plates prior to their installation in the freight car and the holes so formed may thus be readily used as drill guides in the formation subsequently of holes in the existing wooden lining of the freight car to which the plates are attached. It is contemplated that in many instances both the sleeves and the metal plates will be used to strengthen the walls of the holes.

The metal plates may also be applied to the deck, end walls, and as an artificial ceiling in the freight car in order to provide a virtually unlimited number of freight loading arrangements. In the practice of the invention, the holes which are formed in the inner wall or lining of the freight car preferably extend completely through the wall so that the bearing surfaces on the ends of the cross bars may project into the space between the inner wall and the outer wall of the freight car. This feature permits rather long bearing surfaces to be used and eliminates the possibility that the bars might become disconnected from the walls as a result of substantial deflections during use of the freight car. In the event that the car is one of the insulated types, for example, a refrigerator car having insulating material between the inner wall and the outer wall, closed-end thimbles are placed in the holes in the inner lining and seal the inside of the freight car from the space between the inner and outer walls.

There are other objects and features of the invention and these, as well as the preceding, will appear upon consideration of the accompanying drawings, in which.

Figure 1:
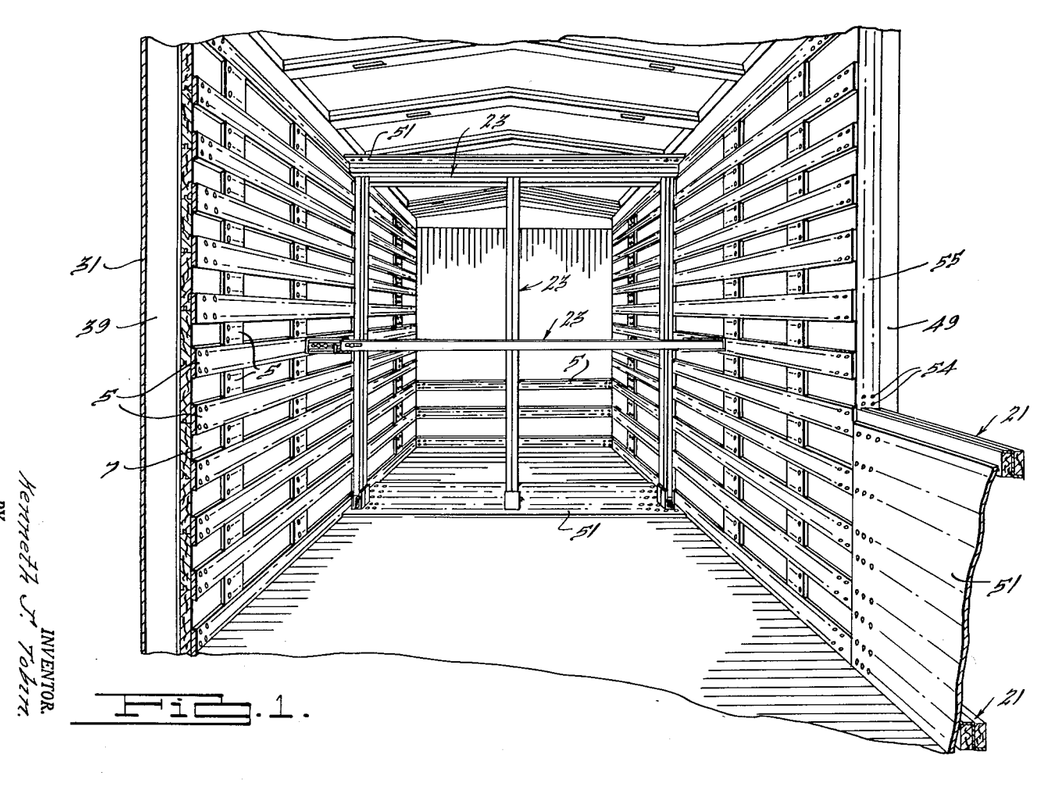
FIGURE 1 is a perspective view of the interior of a freight car embodying the invention and looking lengthwise of the freight car, the thickness of the metal strips 5 being substantially exaggerated.
Figure 2:
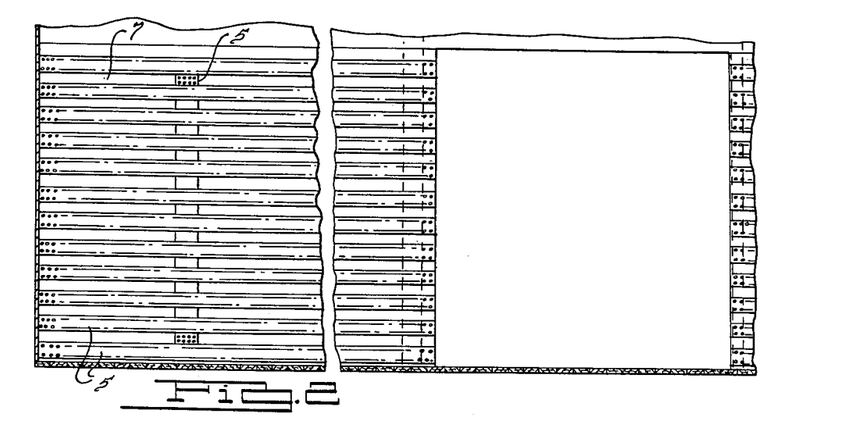
FIG. 2 is a vertical section lengthwise of a freight car embodying the invention with parts broken away.
Figure 3:
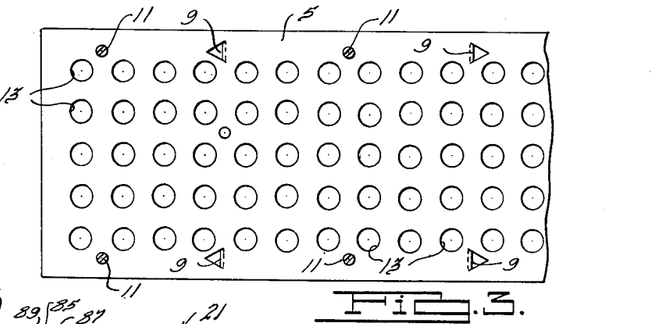
FIG. 3 is a plan view of a suitable plate that may be mounted on the inner wooden wall of a freight car in the practice of the invention.

As best seen in FIGS. 1 and 2, the preferred form of the invention contemplates the attachment of a series of thin metal strips 5, preferably about one-eighth of an inch in thickness, to the inside face of the usual wood tongue and groove inside wall or lining 7 of the freight car. Though the strips may be wider or smaller, they are preferably about 6 inches in width and as long as possible consistent with reasonably ease in handling and installation. As seen from an enlarged view of one of the plates in FIG. 3, they preferably have non-skid tangs 9 sheared out and bent normal to the main body of the strip which serve as a means for temporarily attaching the strips to the wooden walls of the car. The tangs will hold the strips 5 in place while screws 11 are inserted through suitable holes in the plate to thread into the wooden lining 7 and permanently secure the strips in place. The strips 5 preferably have a series of holes 13 formed therein by a suitable punching operation prior to their mounting on the wall 7 of the freight car. These holes may be of a size and location that vary widely from the arrangement shown in FIG. 3 and may, for example, be ¾ of an inch in diameter with the center spaced an inch and a half apart and arranged in horizontal and vertical rows. After the strips 5 have been mounted on the walls 7, they serve as convenient templates or drill guides for the gang drilling of holes 15 in the wooden lining 7.

Figures 6B, 6C, 7, 8:
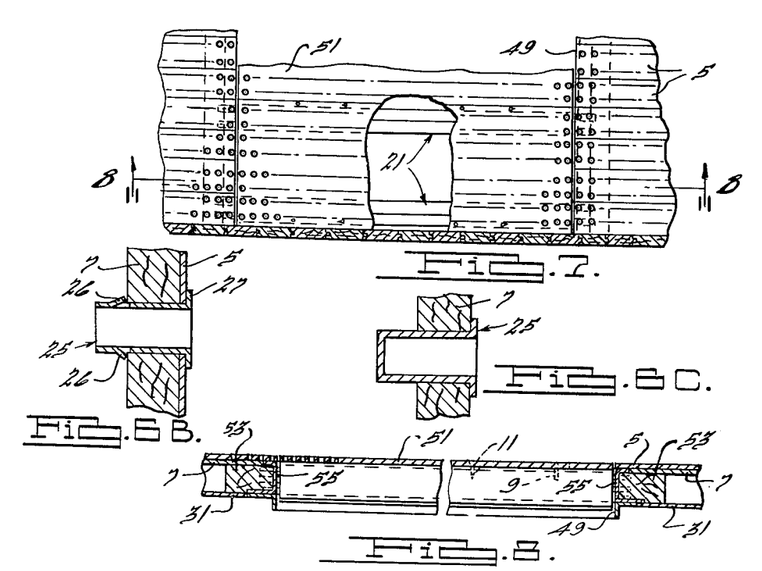
FIG. 6B shows a thimble having tangs formed in it whereby it may be used to hold the metal strip in place, the tanks serving to prevent the thimble from backing out.
FIG. 6C shows the use of a thimble without a reinforcing strip.
FIG. 7 is a vertical section through a portion of a freight car with parts broken away and parts removed and shows a method of bulkheading the doorway of the car.
FIG. 8 is a section taken on the line 8—8 of FIG. 7.
Figure 9:
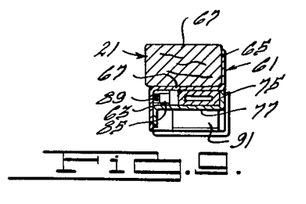
FIG. 9 is an end view of the cross bars shown in FIG. 4.
Figure 10:
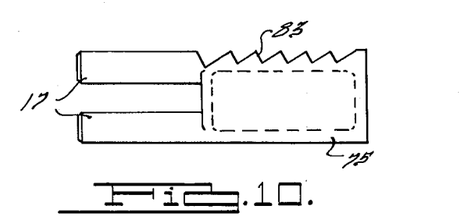
FIG. 10 is a detail plan view of the bolt used in the cross bars of FIGS. 9 and 4.

FIGS. 1 and 2 illustrate the use of plates 5 wherein they extend horizontally throughout the length of the car and are spaced vertically from each other. These figures also show the use of strips 5 arranged to extend vertically. It will be appreciated that the spacing between adjacent strips may be varied, as desired, and may be unequal, e.g., closer together in the lower half of the freight car to accommodate more common types of loading, or may be fitted against each other to completely cover the face of the lining 7, as shown in FIG. 7. Inasmuch as the plates or strips 5 are ordinarily no thicker than about ⅛ of an inch, it will be seen that their attachment to the linings 7 does not result in any significant decrease in the inside dimension of the car and, furthermore, that a substantially flush wall having no harmful projections is retained. Furthermore, when compared with prior freight loading systems, it will be seen that the dead weight is practically eliminated.

The holes 13 which are formed in the plate and the aligned holes 15 in the wood lining receive and support suitable axially projecting bearing surfaces on the ends of cross bars that traverse the interior of the freight car. The cross bar bearing surfaces are preferably in the form of cylindrical pins 17 and 19, as will be readily observed in FIGS. 4 and 5, on the ends of the cross bars 21 and 23, respectively. There is sufficient clearance between the walls of the holes and the pins 17 and 19 to take care of the usual misalignments.

Figure 4:
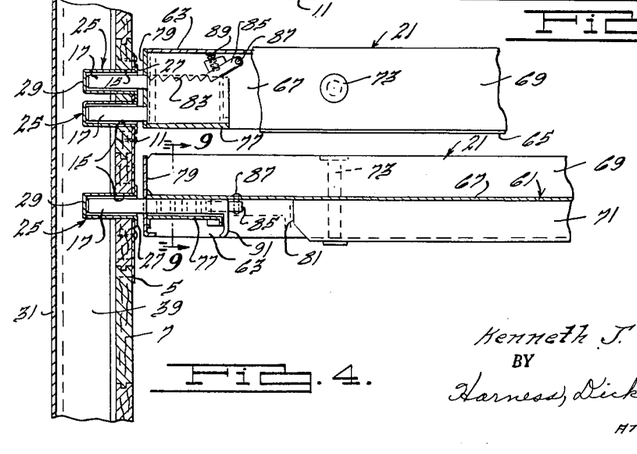
FIG. 4 is a vertical section through the inner and outer side walls of a freight car and shows a preferred form of cross bar mounted on the wall in two positions which are spaced 90 degrees from each other.
Figures 5, 6, 6A:
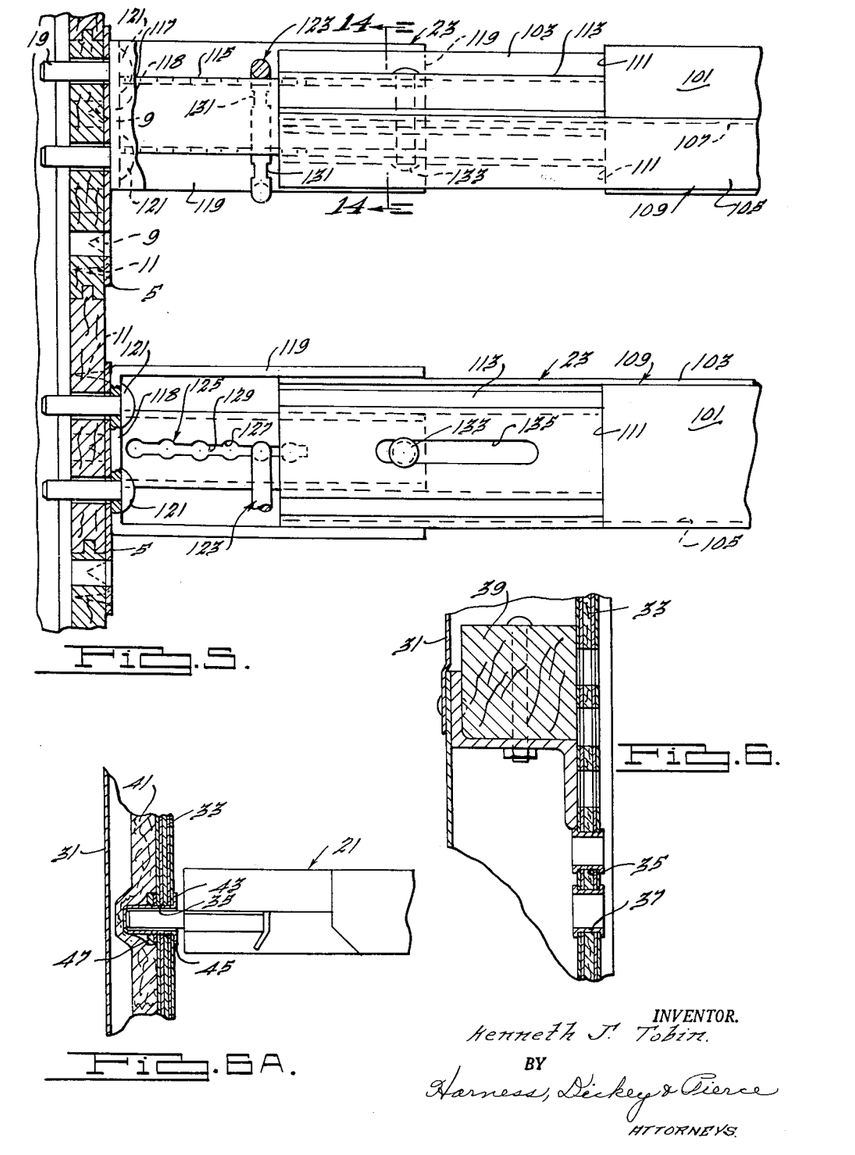
FIG. 5 is a view similar to that of FIG. 4 showing a different form of cross bar and the use of the metal plate alone without sleeves inserted in the holes in the wooden lining.
FIG. 6 illustrates the substitution of a composite metal and wood lining for the normal wooden lining of the freight car, the substituted lining being provided with holes for supporting the cross bars.
FIG. 6A illustrates the use of the composite lining of FIG. 6 with an insulating barrier wherein a closed end thimble is used to provide a seal between the inside of the car and the space between the inner and outer wall.

The major loads applied to the cross bars are lengthwise of the freight car and are occasioned by impact upon starting or stopping the car. These loads are transmitted through the bearing pins 17 or 19 to the walls of the holes 13 and 15. Inasmuch as the wood of the lining 7 is relatively soft, it will serve to some extent to cushion the loads as well as to dampen vibratory tendencies of the cross bar. The loads lengthwise of the freight car are in large measure transmitted to the strips 5 which also extend lengthwise of the freight car in the preferred embodiment. The load on the edge of any one hole 13 is therefore distributed over a wide area of the metal plate 5, and it will be recognized that the plate 5 acts as a tension member to react against the loads placed on the cross bars 21 or 23. The load in the plate 5 is transmitted into the side wall lining 7 through the tangs 9 and the screws 11 but, in view of the large areas involved as compared with the wall of a single hole 13, the unit stress will be relatively small.

Particularly, when heavier loads are expected to be handled, it is preferable to place sleeves or thimbles 25 in the holes 13 and 15, such as the closed-end thimbles shown in FIG. 4. These may be provided with radial flanges 27 that are welded or otherwise suitably secured to the side faces of the plates 5. The thimbles 25 will take the wear which would normally be applied to the edges of the holes 13 and 15 and yet will not interfere with the advantages of load distribution as mentioned hereinbefore. It will be seen that because of the closed ends 29 the thimbles 25 are constructed so that they provide a chamber for the pins which is sealed from the space between the inner wall 7 and the outer wall 31 of the freight car. Thus, if the space between the inner and outer walls is intended to serve as an insulating barrier, the present freight loading apparatus will not increase the rate of heat transfer between the inside and outside of the car.

It is, of course, within the broad purview of the invention to use the thimbles 25 without the strips 5 (FIG. 6C).

While it is preferred to attach plates 5 to the existing wooden linings 7 in a freight car, the invention may also be embodied in a freight car having a composite lining 33 substituted for the wooden lining 7 as shown in FIGS. 6 and 6A. The lining 33 can be made up of thin sheets of metal on the inner and outer faces and sheets of metal on the inside alternated with thin layers of wood so as to provide composite metal and wood construction. With this type of construction, the thickness of the inner wall, i.e., wall 33, can be reduced somewhat over that of the normal wood lining 7 with the result that the inside dimensions of the car are actually increased even though it is still adapted for freight loading apparatus. The composite lining 33 is preferably provided with holes 35 that extend through it and these preferably contain linings such as the sleeve 37 shown in FIG. 6. The sleeve may have its ends turned over to form radial flanges by means of which it is secured to the lining 33, this operation being done before the lining 33 is attached to the conventional longitudinally spaced upright posts 39 of the car.

In case the space between the inner and outer walls 31 and 33 is used for insulation, as shown by the insulating material 41 in FIG. 6A, it is preferable that the linings for the holes 35 be thimbles having closed ends such as the thimble 43. This thimble has a radial flange 45 which bears against the inside face of the lining 33 and the body of the thimble may be threaded to receive a nut 47 on the outside face of the lining 33 whereby the thimble is clamped tightly in place on the plate, this operation being done before the plate 33 is mounted in the freight car.

It will be appreciated that it is within the scope of the invention to simply press-fit the sleeve or bushing in the hole 35 or 15. Also resilient tangs 26 may be formed in the side walls of the thimbles 25 to spring out behind the wood lining 7 (FIG. 6B) whereby they serve to hold the thimble 25 and strip 5 in place on the lining or alternately threads could be rolled into the outer diameter of the thimble so that it could screw into the wooden lining.

As shown in FIGS. 7 and 8, the perforated plates may be used as bulkheads for the doorway 49 of the freight car. For this use, the plates 51 may be used instead of plates 5 and they are preferably substantially wider, a suitable width being 24 inches. The doorway 49 is preferably made the same width as the inside of the freight car. When this is done, the plates 51 may be used to bulkhead the door and may also be placed on the floor of the freight car transversely of the width of the car, as shown in FIG. 1. This arrangement also permits the cross bars 21 or 23, which span the transverse width of the freight bar, to be used to support the plates 51.

For this purpose, the door posts 53 on either side of the door opening 49 are provided with vertical rows of apertures 54 to receive the pins 17 or 19 on the ends of the cross bars. The posts 53 are ordinarily made up of a substantially channel-shaped metal facing 55 which protects the major wooden body of the post. The tangs 9 or the screws 11 may be used as means for securing the plates 51 to the cross bars and the arrangement is preferably such that the plates 51 are flush with the inside lining of the car as illustrated in FIGS. 1 and 8. It will be seen that, since the cross bar is on the outside of the plate 51, loads within the freight car tend to hold the plates in place. In the event that grain or other fluid material is carried within the freight car, paper or the like can be used to cover the openings in the plates 51. Obviously, the plates 51 could be eliminated and other types of bulkheading utilized in conjunction with the cross bars which extend between the door posts 53.

As shown in FIG. 1, the deckboards 51 can be used to form a ceiling for the freight car and may be supported for this purpose by vertical and horizontal cross bars as illustrated. It will also be appreciated that cross bars and deckboards can be used together to provide bins and compartments within the car and betwen the side walls thereof. For example, the deckboards can be extended vertically and longitudinally of the car and intermediate the side walls, so as to divide the width of the car, as by supporting them on vertical cross bars such as the bar 23 shown in FIG. 1. As will appear later, the cross bar 21a of FIG. 12 can also be advantageously employed in these arrangements and for bracing lading at intermediate positions within the car.

The construction of the cross bar 21 is best illustrated by reference to FIGS. 4 and 9–11. This bar has the conventional Z-shaped metal reinforcing bar 61 with side legs 63 and 65 that extend in opposite directions from the transverse connecting web 67. Wooden 2 x 4's (or pieces of other suitable size) 69 and 71 are mounted on the bar 61 on opposite sides of the connecting web 67. Bolts 73 may be used to tightly clamp the wooden bars 69 and 71 against the web 67. The axially projecting pins 17 are preferably formed as an integral part of a sliding bolt 75 which is supported between the web 67 and a retainer plate 77 that is welded to the leg 63 and bottom of leg 65 and to an end plate 79 likewise welded to the end of the reinforcing bar 61. The bolt 75 and retainer 77 fit in a space beneath the web 67 which is provided by terminating the wooden bar 71 inwardly of the end of the cross bar as shown at 81. The end plate 79 has holes in it which slidably pass the pins 17 but the plate serves to prevent movement of the bolt 75 beyond the end of the bar 21. Movement inwardly of the bar toward the withdrawn dotted line position is prevented by a ratchet means which preferably includes the teeth 83 that are formed on the side of the bolt 75 and engage a dog 85 that is pivoted by pin 87 to the web 67 and held pressed against the bolt by a spring 89 confined between it and the leg 63 of the reinforcing bar 61. The bolt 75 has a downwardly extending flange 91 that is accessible from the bottom of the bar when it is mounted as shown in FIG. 4 and which may be grasped in order to retract the bolt after the dog 85 has been pried away from the teeth 83.

Figure 11:
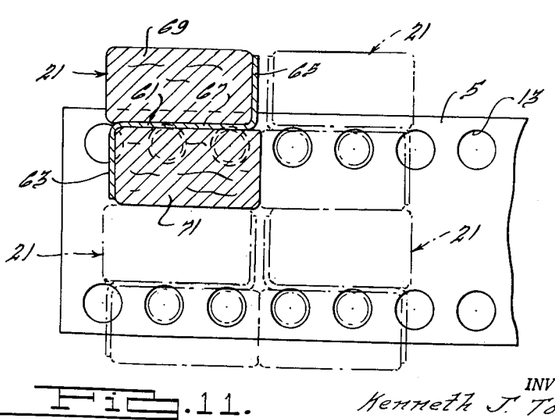
FIG. 11 is a cross section through the cross bar of FIG. 4 when it is mounted on one of the plates and shows in phantom lines how the effective section of the cross bar may be built up by the use of other cross bars.
Figures 17, 18, 19, 20, 21, 22:
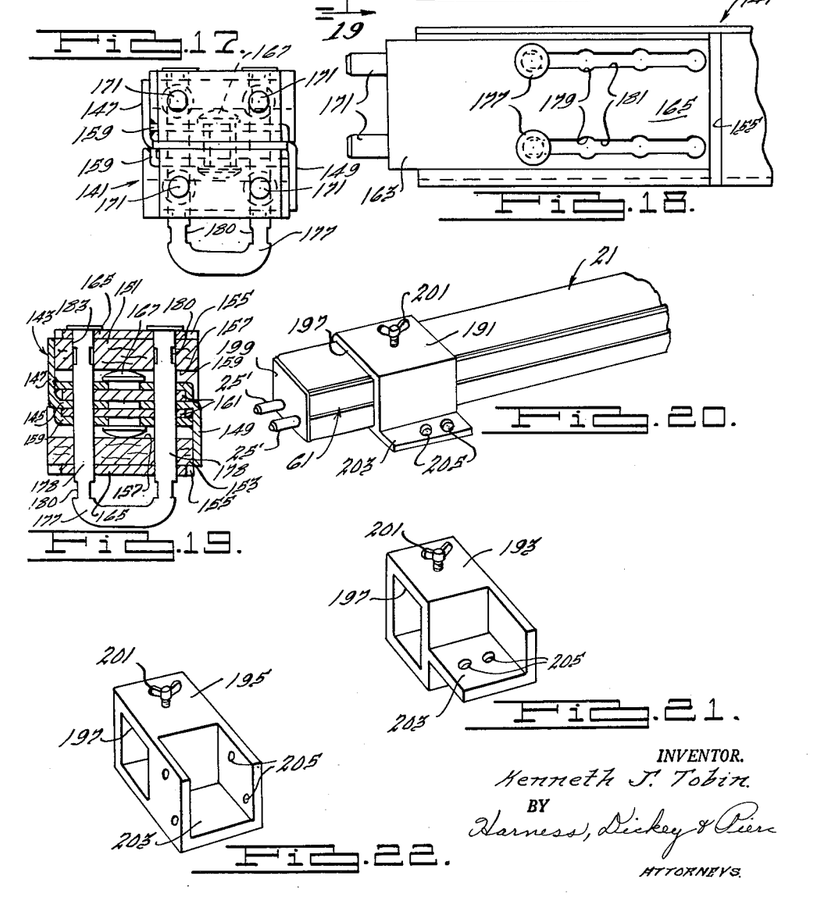
FIG. 17 is an end elevation taken from the left of FIG. 16.
FIG. 18 is a plan view of structure shown in FIG. 16.
FIG. 19 is a section taken on line 19—19 of FIG. 16.
FIG. 20 is a perspective view of a cross bar having slidably mounted thereon a fixture for holding special loads.
FIGS. 21 and 22 are perspective views of other forms of fixtures which may be mounted on the cross bar in the manner shown in FIG. 18.

It will be seen that the two pins 17 are eccentric with respect to the center line of the bar 61. Various spacings can therefore be obtained by turning the bar about its center line. In the event that an extremely strong cross bar means is needed, more than one cross bar may be used in a given locality as illustrated in FIG. 11. As shown herein, the holes 13 are arranged so that the bars 21 can be positioned in groups which engage each other to distribute the load among them. It will be noticed that by retracting the bolt, the pins 17 may be withdrawn inside of the bar 21. The other end of the bar may be provided with a similar telescopic adjustment for pins 17 or the pins may be simply affixed by means of a strap or the like to the end of the bars 61, 69 and 71 (FIG. 20).

Figure 12:
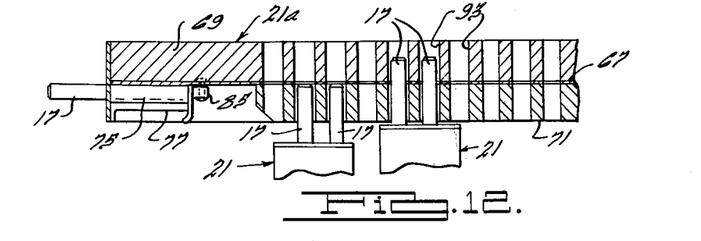
FIG. 12 is a cross section through a modified form of the cross bar of the type shown in FIG. 4 wherein the body of the bar is provided with transverse apertures which receive the projecting pins on the ends of other cross bars.

It is contemplated that on occasion, it may be desired to use a cross bar as a support for the ends of other cross bars. FIG. 12 illustrates a cross bar 21a which is adapted to such use by means of transverse apertures 93 formed therein through both the bars 69 and 71 and web 67. The apertures 93 will receive and support the pins 17 on the ends of cross bars 21.

Figure 13:
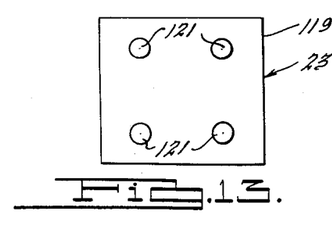
FIG. 13 is an end view of the cross bars shown in FIG. 5.
Figure 14:
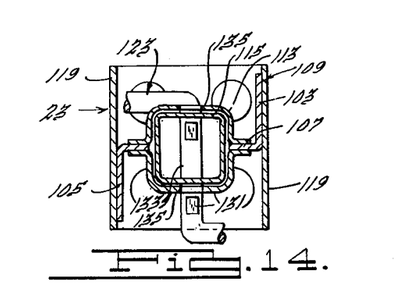
FIG. 14 is a section taken along the line 14—14 of FIG. 5.

Another form of cross bar 23 is shown in FIGS. 5, 13 and 14. In this form, the wooden 2 x 4's 101 are supported by the legs 103 and 105 and web 107 of the Z-shaped metal reinforcement bar 109. The wooden bars 101 terminate inwardly of the end of the bar 109 as shown at 111. Extending outwardly from the ends 111 of the bars is a square tube 113 that may be formed by flanged half-tube sections welded or otherwise affixed to the web 107 of the bar 109 as shown best in FIG. 14. The web 107 may be cut out in the area covered by the tube 113 so that a second square tube 115 can readily slide therein. The tube 115 is welded or otherwise fixedly secured at its outer end 117 to the bight 118 of a U-shaped strap 119 that embraces and slidably engages the ends of the bar legs 103 and 105. Four pins or rivets 121, that are preferably located on corners of a square as shown in FIG. 13, are fixed to the bight 118 and extend outwardly of the bar to provide the bearing surfaces 19. Obviously, the rivets 121 could be located on corners of a rectangle, or otherwise, if desired. When the pins 121 define a square, the bar 23 may be turned 90 or 180 degrees to equalize wear and eliminate permanent set as well as dispose the larger section modulus in the desired location.

It will be seen that sliding of tube 113 on the tube 115 permits the bar 23 to be adjusted in length. Various minimum length adjustments are permitted by a Z-shaped pin 123 that operates in slots 125 that are formed on the top and bottom of the tube 115. The slots have circular enlargements 127 connected by narrower passages 129 and the pin 123 has cylindrical sections which fit in the circles 127 but not in passages 129 and flats 131 which will move through these passages. Weight of the pin 123 holds the cylindrical sections in the circular holes 127 and thus the pin abuts the end of the tube 113 to prevent shortening of the bar. By lifting the pin and turning it so that the flats 131 can slide in the passages 129, the position of the pin 123 can be changed to thereby adjust the minimum length of the bar. The bar 23 is free to increase in length due to sliding of the tube 113 on tube 115 to the extent permitted by abutment of transverse pin 133 affixed to tube 115 with the outer ends of slots 135 formed in the tube 113. It will be seen that when the pin 133 is at the ends of slots 135, there is a fairly large minimum area of contact between the legs of strap 119 and the bar legs 103 and 105, the pin 133 also preventing the separation of the strap 119 from the bar 109.

Obviously, both ends of bar 23 may be provided with a telescopic adjustment as just described or one end may be non-adjustable as provided, for example, by fixed attachment of the strap 119 with its applied rivets 121, to the other ends of the bars 101 and 109, this attachment being readily accomplished by means of welding to the legs 103 and 105 or by means of transverse bolts.

Figure 15:
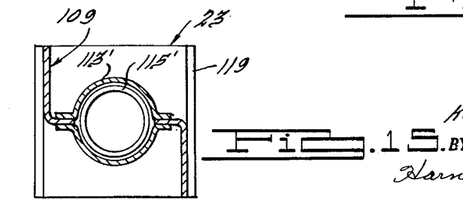
FIG. 15 is a section similar to FIG. 14 showing the modified form of cross bar.

As shown in FIG. 15, which is a view similar to FIG. 14 but with parts removed, the square tubes 113 and 115 may be replaced by round tubes 113' or 115' or by tubes of other shapes, if desired.

Figure 16:
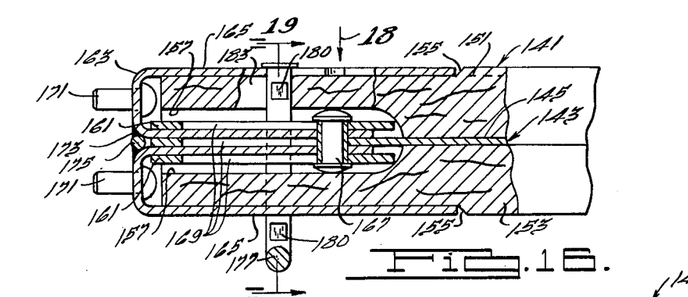
FIG. 16 is a section through the end of a cross bar which is generally similar to the cross bar of FIG. 5 but showing a modified construction.

A cross bar 141 is shown in FIGS. 16 and 17 which uses standard size 2 x 4's and which has a flush outer surface throughout its entire length. In this bar, a typical Z-shaped reinforcement member 143 is used having a web 145 and legs 147 and 149. The top and bottom 2 x 4's 151 and 153 are clamped against the web and adjacent the legs by the usual through bolts (not shown). The outer face of the end of each of the wooden bars is provided with a relief 155 and the inner sides are cut away as shown at 157. A pair of angle shaped retainer plates 159 are disposed in the cutouts 157 and the side edges thereof are welded to the legs and web respectively of the bar 143 as seen in FIGS. 17 and 19. The spaces between the retainer plates 159 and the web 145 form chambers which slidably receive the inner legs 161 of a pair of U-shaped straps 163, the outer legs 165 of the straps fitting in the reliefs 155 so that they lie flush with the outer surfaces for bars 151 and 153. The legs 161 of the straps carry a transverse pin 167 that slides in longitudinal slots 169 formed in the web 145 and in the retainers 159 and which defines the minimum and maximum length of the cross bar 141. The bights of the U-shaped straps 163 have rivets 171 (substantially identical to rivets 121) affixed thereto and these are preferably located so that they define corners of a square as hereinbefore described in connection with cross bar 23. The straps 163 are preferably welded together to form a rigid unit as shown at 173, a filler rod 175 being used to facilitate the welding operation and increase the strength of the weld. A U-shaped gravity stirrup 177 may be used as a slack adjuster to correspond to member 123 and the slack adjusting system of the cross bar 23. The cylindrical legs 178 of the adjuster 177 fit in round holes 179 in the legs 165 of the straps 163 and flat sections 180 in the legs fit in passages 181 that connect the holes 179. The bars 151 and 153, the retainers 159, and the web 145 have slots 183 through which the legs 178 pass and the inner ends of the slots shoulder on the legs to limit the extent to which the cross bar can shorten. By lifting the adjuster 178 and moving the flats 180 through passages 181, its position relative to the ends of the straps 163 can be varied and thus the minimum adjusted length of the bar can be regulated to hold the cross bar locked between side walls of the car.

FIGS. 20-22 illustrate the use of several fixtures 191, 193 and 195 with a cross bar, the fixtures being designed to hold special types of articles such as motors, machines, etc. Each has a rectangular hole 197 by means of which it is slidably but nonrotatably mounted on the cross bar, the non-adjustable end of a cross bar 23 having axially fixed bearing surfaces 25' carried by an end plate 199 welded to the Z-bar 61 being shown in FIG. 20. A tightening bolt or screw 201 threads through a wall of each hole 197 to serve as means for clamping it tightly on the cross bar in a fixed position. Each of the fixtures has a lateral projection 203 upon which the article to be carried rests, and to which it may be bolted, if desired, through the medium of holes 205.

It will now be realized that the present invention provides freight loading apparatus which does not reduce the inside dimension of the car and which maintains a substantially flush inside lining in the car. Furthermore, the apparatus does not appreciable increase the dead weight of the freight car and, when the cross bars are removed, substantially a regular freight car remains. The number of different parts and the weight of the apparatus have been reduced to a minimum and yet the stability of the present freight loading apparatus is comparable to that of any known loading equipment. Additionally, the apparatus is such that a flush lining may be used for special purposes such as for the loading of grain. Also, the apparatus is well adapted to use in insulated or refrigerated cars. The cross bars are such that they can stand the severe punishment to which they are subjected in actual use, such as being thrown out of the freight car so that they land on their end sections. In the form of cross bar wherein four axial pins are used, permanent set and wear on the four sides of the bar can be equalized by turning the bar 90 or 180 degrees, and this feature also permits the increased bending resistance of one side of the bar to be used either horizontally or vertically, as desired. The cross bars and the arrangement of the inside walls of the freight car are such that advantage is taken of the space between the inner and outer walls to house the axially projecting pins and, as pointed out hereinbefore, the use of the thimbles and metal strips serves to distribute load throughout wide areas of the inner lining.

It is evident that some of these benefits can be obtained by modifying the structure shown herein in accordance with the principles described above. Hence, it is not intended to limit the invention to the precise constructions which have been revealed for purpose of illustration. It will also be evident that the invention can be used to advantage in ships, trucks, warehouses, etc., all of which may, in a certain sense, be considered equivalents of a freight car.

This application is a division of my copending application Serial No. 561,026, filed January 24, 1956, now Patent No. 2,873,695, which in turn is a continuation of my abandoned application Serial No. 258,403, filed November 27, 1951.

What is claimed is:

1. A crossbar for freight loading apparatus comprising an elongated body having a longitudinally extending tube secured thereto, a head slidably carried by one end of the body for longitudinal movement with respect to the body, and four axially projecting pins carried by the head and located on the corners of a square, said head comprising a U-shaped strap carrying said pins and having legs engaging the outside of the body, a longitudinally extending tube mounted on said strap extending in spaced parallel relation to said legs and interfitting with said longitudinally extending tube secured to the body and substantially preventing lateral movement of said head relative to said body.

2. The invention set forth in claim 1 including slack adjusting means connected to the tubes providing an adjustable stop for limiting relative movement in one direction between said tubes.

3. A crossbar for freight loading apparatus comprising an elongated metal reinforcing bar including a central web portion, elongated wooden bars mounted on each side of said web portion of said metal bar with end portions of said wooden bars disposed in spaced parallel relation to an end portion of said web portion of said metal bar, retainer plates between said end portions of the wooden bars and said end portion of said web portion of said metal bar, means securing said plates to said bar in spaced parallel relation to said web portion, a pair of U-shaped straps each having an inner leg slidable in the space between a said retainer plate and said web portion of said metal bar and an outer leg slidably engaging the outside of one of said wooden bars, axially projecting pins carried by the bights of the U-shaped straps, means securing the straps together for joint movement, and means for defining the limits of sliding movement of said straps relative to said bars.

4. The invention set forth in claim 3 wherein said wooden bars are standard size 2 x 4's and said wooden bars have recesses in their outer surfaces, each receiving one leg of one of said straps whereby said straps are flush with the outer surfaces of the wooden bars.

References Cited in the file of this patent

UNITED STATES PATENTS

| | | |
|---|---|---|
| 540,594 | Meres | June 4, 1895 |
| 743,964 | Weir | Nov. 10, 1903 |
| 1,215,763 | Beatty | Feb. 13, 1917 |
| 1,485,228 | Johnson | Feb. 26, 1924 |
| 1,646,982 | Schlafly | Oct. 25, 1927 |
| 1,665,439 | Brown | Apr. 10, 1928 |
| 1,831,815 | MacChesney | Nov. 7, 1931 |

(Other references on following page)

UNITED STATES PATENTS

| | | | |
|---|---|---|---|
| 1,970,781 | Stevens | Aug. 21, | 1934 |
| 2,030,773 | Thomas | Feb. 11, | 1936 |
| 2,091,869 | McCurdy | Aug. 31, | 1937 |
| 2,122,950 | Reifer | July 5, | 1938 |
| 2,125,209 | Thomas | July 26, | 1938 |
| 2,127,966 | Strid et al. | Aug. 23, | 1938 |
| 2,203,107 | Schmitz | June 4, | 1940 |
| 2,262,085 | Allen | Nov. 11, | 1941 |
| 2,268,394 | Hebert | Dec. 30, | 1941 |
| 2,294,795 | Moses | Sept. 1, | 1942 |
| 2,319,471 | Nystrom | May 18, | 1943 |
| 2,361,081 | Brandon | Oct. 24, | 1944 |
| 2,390,873 | Ditchfield | Dec. 11, | 1945 |
| 2,497,683 | Nampa | Feb. 14, | 1950 |
| 2,519,846 | Nampa | Aug. 22, | 1950 |
| 2,556,302 | Stough et al. | June 12, | 1951 |
| 2,575,751 | Donnelley | Nov. 20, | 1951 |
| 2,592,666 | Doherty | Apr. 15, | 1952 |
| 2,593,174 | O'Dell | Apr. 15, | 1952 |
| 2,608,420 | Eck | Aug. 26, | 1952 |
| 2,616,375 | Nampa | Nov. 14, | 1952 |
| 2,617,369 | Ustad | Nov. 11, | 1952 |
| 2,627,821 | Sjogren | Feb. 10, | 1953 |
| 2,747,520 | Brown | May 29, | 1956 |
| 2,806,436 | Johnston | Sept. 17, | 1957 |
| 2,873,695 | Tobin | Feb. 17, | 1959 |
| 2,919,662 | Tobin | Jan. 5, | 1960 |